(12) United States Patent
Sedlar et al.

(10) Patent No.: US 8,500,130 B2
(45) Date of Patent: Aug. 6, 2013

(54) RADIAL SHAFT SEAL, RADIAL SHAFT SEAL ASSEMBLY AND METHOD OF INSTALLATION

(75) Inventors: Brent R. Sedlar, Ann Arbor, MI (US);
David M. Toth, Brighton, MI (US);
Ronald M. Noteboom, II, Lenox, MI (US)

(73) Assignee: Federal-Mogul Corporation, Southfield, MI (US)

( * ) Notice: Subject to any disclaimer, the term of this patent is extended or adjusted under 35 U.S.C. 154(b) by 749 days.

(21) Appl. No.: 12/695,404

(22) Filed: Jan. 28, 2010

(65) Prior Publication Data

US 2010/0187768 A1 Jul. 29, 2010

Related U.S. Application Data

(60) Provisional application No. 61/147,938, filed on Jan. 28, 2009, provisional application No. 61/226,368, filed on Jul. 17, 2009.

(51) Int. Cl.
*F16J 15/32* (2006.01)

(52) U.S. Cl.
USPC .......................... 277/560; 277/559; 277/561

(58) Field of Classification Search
USPC .................. 277/549, 559, 560, 561, 562
See application file for complete search history.

(56) References Cited

U.S. PATENT DOCUMENTS

| | | | |
|---|---|---|---|
| 2,635,907 A | 4/1953 | Heimbuch | |
| 2,736,586 A | 2/1956 | Riesing | |
| 2,743,947 A | 5/1956 | Foss | |
| 3,941,396 A | 3/1976 | Bailey et al. | |
| 4,021,049 A | 5/1977 | Phelphs et al. | |
| 4,061,346 A | 12/1977 | Coleman et al. | |
| 4,274,641 A | 6/1981 | Cather, Jr. | |
| 4,449,717 A | 5/1984 | Kitawaki | |
| 4,588,195 A | 5/1986 | Antonini et al. | |
| 4,721,314 A | 1/1988 | Kanayama | |
| 4,844,484 A | 7/1989 | Antonini et al. | |
| 4,940,248 A | 7/1990 | Kilthau et al. | |
| 4,968,044 A | 11/1990 | Petrak | |
| 6,029,980 A * | 2/2000 | Downes | 277/552 |
| 6,105,968 A | 8/2000 | Yeh et al. | |
| 6,601,855 B1 | 8/2003 | Clark | |

(Continued)

FOREIGN PATENT DOCUMENTS

| | | |
|---|---|---|
| DE | 3612420 | 10/1987 |
| DE | 3613220 | 10/1987 |

(Continued)

*Primary Examiner* — Gilbert Lee

(74) *Attorney, Agent, or Firm* — Robert L. Stearns; Dickinson Wright, PLLC

(57) ABSTRACT

A radial shaft seal configured for receipt in a housing and about a shaft to sealingly isolate an air side of the seal from an oil side of the shaft seal is provided. The seal includes a mounting portion and a seal lip having an annular sealing surface extending between an oil side end and a free air side end. An annular bridge is connected to the oil side end of the seal lip by a first hinge and to the mounting portion by a second hinge. The bridge extends from the first hinge to the second hinge in radially overlying relation to the seal lip. A projection extends from the first hinge away from the bridge toward the oil side of the seal to prevent the seal lip from inverting during the oil-side installation assembly.

49 Claims, 17 Drawing Sheets

U.S. PATENT DOCUMENTS

| | | |
|---|---|---|
| 6,619,664 B1 | 9/2003 | Metz |
| 6,866,271 B2 | 3/2005 | MacDonald |
| 6,921,080 B2 | 7/2005 | Johnen |
| 7,134,669 B2 | 11/2006 | Uhrner |
| 7,182,346 B2 | 2/2007 | Yamamoto et al. |
| 7,284,758 B1 | 10/2007 | Hart et al. |
| 7,458,586 B2 | 12/2008 | Salameh |
| 7,464,942 B2 | 12/2008 | Madigan |
| 7,823,887 B2 | 11/2010 | Geldenhuys |
| 8,052,152 B2 * | 11/2011 | Sedlar et al. ................ 277/561 |
| 2003/0006563 A1 | 1/2003 | Carter et al. |
| 2004/0124587 A1 | 7/2004 | Yamamoto |
| 2005/0012277 A1 | 1/2005 | Adrion et al. |
| 2006/0103075 A1 | 5/2006 | Zahn |
| 2006/0186603 A1 * | 8/2006 | Berdichevsky ............... 277/559 |
| 2008/0203673 A1 * | 8/2008 | Kanzaki et al. ............... 277/402 |
| 2008/0217865 A1 | 9/2008 | Sedlar et al. |
| 2008/0284110 A1 | 11/2008 | Dahlheimer |
| 2008/0309024 A1 | 12/2008 | vom Schemm |
| 2010/0187768 A1 | 7/2010 | Sedlar et al. |
| 2010/0187769 A1 | 7/2010 | Sedlar et al. |
| 2010/0244390 A1 | 9/2010 | Berdichevsky et al. |

FOREIGN PATENT DOCUMENTS

| | | |
|---|---|---|
| JP | 04-107580 U | 9/1992 |
| JP | 6193741 | 7/1994 |
| JP | 2003-269616 A | 9/2003 |
| JP | 2006-226489 A | 8/2006 |
| JP | 2008-075679 A | 4/2008 |
| WO | 9008273 | 7/1990 |

* cited by examiner

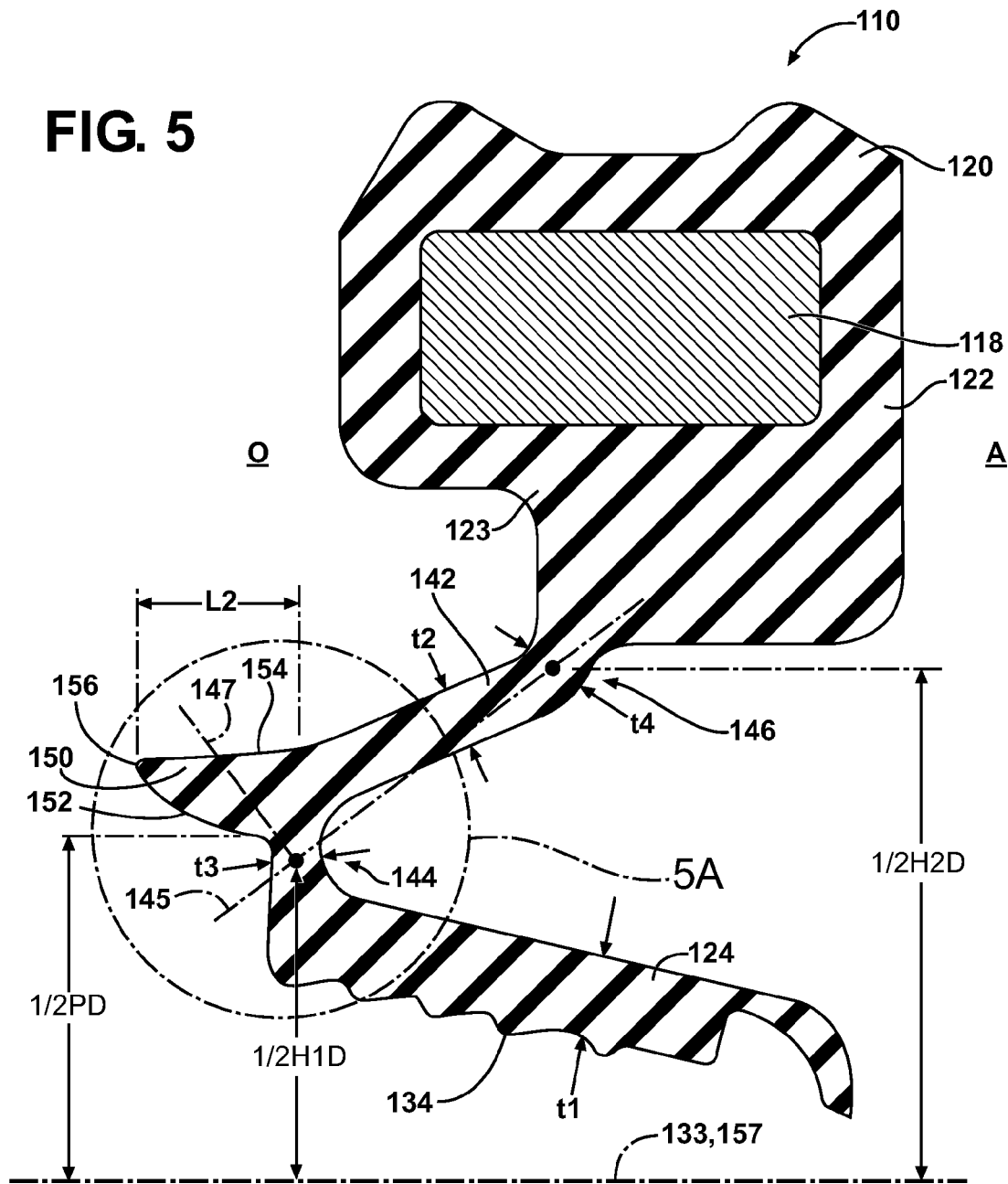

RADIAL SHAFT SEAL, RADIAL SHAFT SEAL ASSEMBLY AND METHOD OF INSTALLATION

CROSS-REFERENCE TO RELATED APPLICATION

This application claims the benefit of U.S. Provisional Application Ser. No. 61/147,938, filed Jan. 28, 2009, and also the benefit of U.S. Provisional Application Ser. No. 61/226,368, filed Jul. 17, 2009, which are both incorporated herein by reference in their entirety.

BACKGROUND OF THE INVENTION

1. Technical Field

This invention relates generally to dynamic oil seals of the type for creating a fluid tight seal between a rotating shaft and a housing.

2. Related Art

Dynamic radial shaft oil seals are designed to have a so-called "oil side" of the seal and an "air side." These designations pertain to the orientation of the seal when installed, with the oil side facing the interior of the housing and in communication with the oil, whereas the air side faces outwardly and is exposed to the air.

There are at least two different ways in which a radial shaft oil seal can be installed. An "air side installation" is one in which the seal is first installed into the bore of the housing and the shaft (or its wear sleeve) thereafter installed from the air side axially into the seal assembly (in the direction inward of the housing) to effect the seal. An "oil side installation" is the other where the housing and shaft are already present and the seal assembly is slid axially into the housing and simultaneously onto the shaft (or its wear sleeve), such that the shaft enters the seal assembly from the oil side of the seal. Otherwise, "oil-side" installation requires the seal assembly to be installed into the housing, also referred to as carrier, and then the housing, with seal installed therein, is assembled to an engine over the "all ready in place" shaft.

During installation, regardless of the type, the seals must be able to withstand the axial loads resulting during installation without causing a seal lip of the seal to reverse fold or otherwise become displaced to a position where the seal lip is ineffective in the fully installed condition.

Radial shaft seals are also subject to varying axial pressures that can be seen during leak testing or in use. The pressure differential developed across the seal (between the oil and air side of the seal) can impart an axial load on the seal in one direction or the other (a vacuum or increased pressure in the housing) and can cause the seal to pull away from the shaft to at least some degree, and in extreme cases can cause the seal to reverse fold and collapse under the pressure so that the seal is broken.

SUMMARY OF THE INVENTION

In general terms, this invention provides a radial shaft seal assembly having features that facilitate making a proper oil side installation, even in conditions of shaft-to-bore misalignment, and further, provide support for a seal lip of the seal assembly against adverse seal-breaking movement when exposed to positive or negative pressure on an oil side of the seal assembly when installed.

In accordance with one presently preferred aspect of the invention, a radial shaft seal configured for receipt in a housing and about a shaft to sealingly isolate an air side of the shaft seal from an oil side of the shaft seal is provided. The radial shaft seal includes an annular mounting portion and a seal lip having an annular sealing surface extending between an oil side end and a free air side end, with the sealing surface being configured to extend axially relative to the shaft. Further, an annular bridge is connected to the oil side end of the seal lip by a first hinge and to the mounting portion by a second hinge. The bridge extends from the first hinge to the second hinge in radially overlying relation to the seal lip. At least one projection extends from the first hinge away from the bridge toward the oil side of the seal. The projection prevents the seal lip from inverting during the oil-side installation process, thereby ensuring that the seal lip attains its proper sealing contact with a running surface during use.

In accordance with another aspect of the invention, a radial shaft seal assembly is provided. The radial shaft seal assembly includes a shaft extending along a central axis and providing a running surface with a predetermined diameter and a radial shaft seal configured for receipt in a housing and about the shaft to sealingly isolate an air side of the radial shaft seal from an oil side of the radial shaft seal. The radial shaft seal includes an annular mounting portion and a seal lip having an annular sealing surface and an opposite backing surface extending between an oil side end and a free air side end, with the sealing surface being configured to extend axially in dynamic sealing contact with the running surface. Further, an annular bridge is attached to the oil side end of the seal lip by a first hinge and to the mounting portion by a second hinge. The bridge extends from the first hinge to the second hinge in radially overlying relation to the seal lip. In addition, at least one projection extends axially from the first hinge toward the oil side of the seal.

In accordance with another aspect of the invention, a method of installing a radial shaft seal onto a shaft is provided. The method includes providing a shaft having a running surface and providing the radial shaft seal with a seal lip having an annular sealing surface converging from an oil side end to a free air side end while in a free state. Further, providing the radial shaft seal with an annular bridge attached to the oil side end by a first hinge with the bridge diverging to a second hinge while in the free state. The second hinge being attached to an outer mounting portion such that the bridge extends in radially overlying relation with the seal lip. The radial shaft seal further including at least one projection extending axially from the first hinge toward an oil side of the seal. Then, moving the shaft and the radial shaft seal axially toward one another and bringing the oil side end of the seal lip into abutment with an end of the shaft. Further, bringing the projection into abutment with running surface of the shaft and bringing the sealing surface into sealing engagement with the running surface while simultaneously moving the projection out of abutment with the running surface.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 5 is a cross-sectional view of a radial shaft seal constructed according to another aspect of the invention;

DETAILED DESCRIPTION OF PREFERRED EMBODIMENTS

Figure 1:
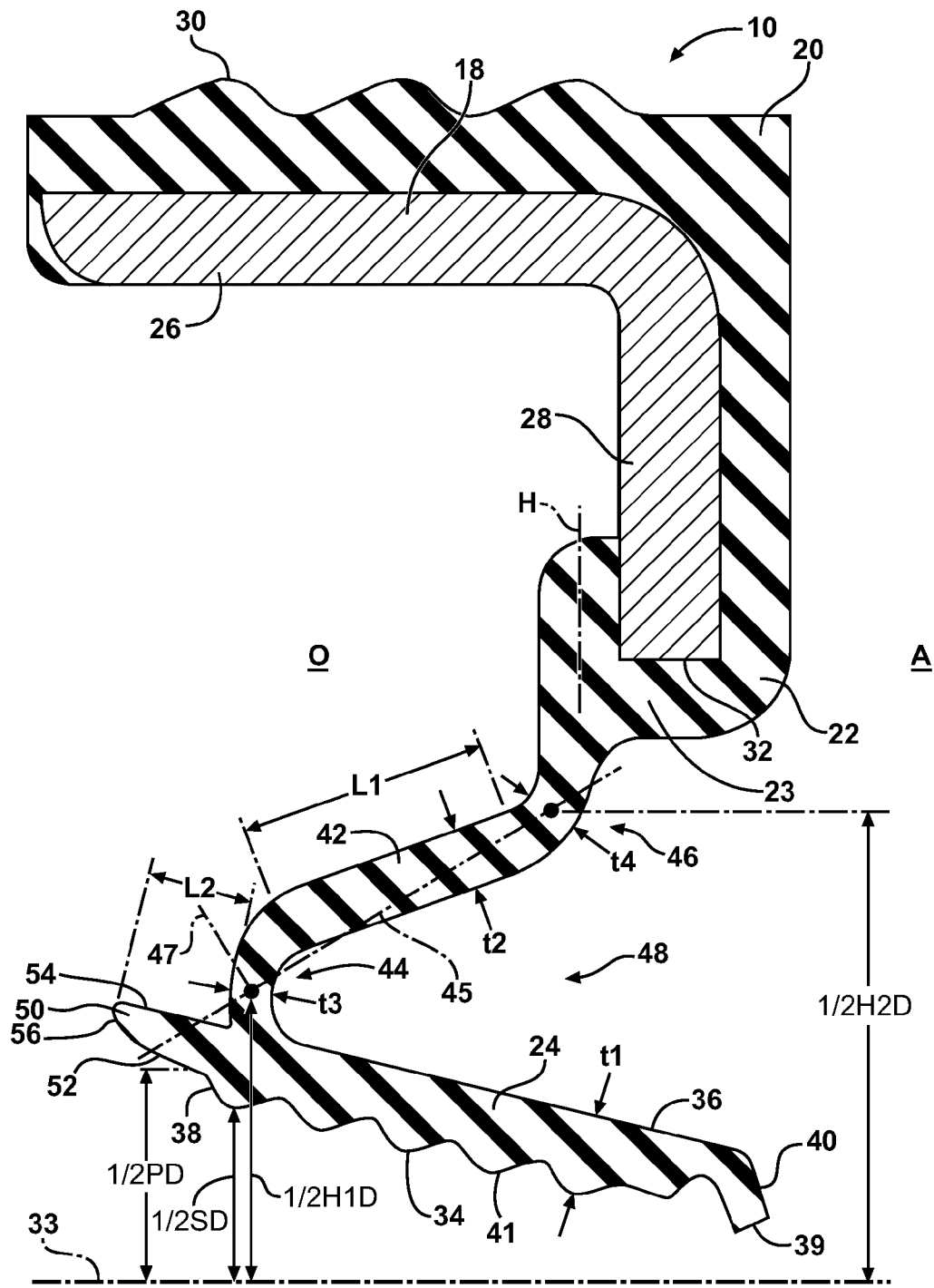
FIG. 1 is a cross-sectional view of a radial shaft seal constructed according to one aspect of the invention.

Referring in more detail to the drawings, FIG. 1 illustrates a radial shaft seal, referred to hereafter as seal 10, constructed in accordance with one aspect of the invention, wherein the seal is suitable for use in a crankcase application, by way of example and without limitation, for sealing about a rotatable shaft 12 in a radial shaft seal assembly 13 (FIGS. 2-4) extending through a bore 14 in the crankcase 16 in which the seal 10 is installed. Otherwise, the seal 10 can be installed into a carrier housing, whereupon the carrier housing and seal 10 can be attached to the engine. The seal 10 has an oil side O and an axially opposite air side A, in relation to the orientation of the seal 10 when installed, with the oil side O facing to the interior of the crankcase 16 and the air side A facing to the outside environment. The seal 10 includes a mounting portion, such as a case, also referred to as core or collar 18, provided as a metal annulus or ring structure with an elastomeric seal material 20 attached thereto. The seal material 20 forms at least part of the an elastomeric seal body 22 with an axially extending seal lip 24 that exhibits low dynamic frictional contact with the shaft 12 during use, thereby resulting in a low torque between the shaft 12 and the seal lip 24, such as between about 0.07-0.35 N*m (Newton meters), as newly installed, during and upon use. Accordingly, as a result of the minimal frictional losses exhibited by the seal 10, the losses in efficiency of the engine are kept to a minimum.

The metal collar 18 may be L-shaped, as illustrated, or may take on any number of configurations, such as ring-shaped, C-shaped or S-shaped, depending upon the requirements of a particular application, as is know in the art. The L-shaped collar 18 has a cylindrical outer wall 26 and a radially inwardly extending leg 28. The metal reinforcing ring structure 18 is shown covered at least in part with the elastomeric seal material 20 on an outer surface of the outer wall 26 which may be contoured with undulations 30 to provide a snug and fluid tight installation in the bore 14 of the crankcase 16. The elastomeric seal material covering 20 forms part of the elastomeric seal body 22 which is molded about the metal collar 18. The seal body 22 extends along the radially inward extending leg 28 of the core 18 on the air side A and extends around an inner end 32 to cover a portion of the oil side O of the leg 28 and to provide a central portion 23 beneath the leg 28. The core 18 and seal body 22 are relatively rigid, yet the seal material 20 is sufficiently resilient to form the seal lip 24.

The seal lip 24, when in the relaxed, uninstalled state (FIG. 1), extends slightly angled by a few degrees, such as between about 1-10 degrees from a horizontal central axis 33 of the seal 10 and has an annular, radially inwardly facing sealing surface 34 and an opposite, radially outwardly facing backing surface 36 extending between an oil side end 38 and a free air side end 40. The sealing surface 34, while in its free state, has a maximum diameter SD at the oil-side end 38 that is less than an outer diameter OD of a running surface 35 of the shaft 12, and thus, the entire sealing surface 34 is assured of being brought into sealing engagement with the running surface 35 upon completing assembly and in use. The sealing surface 35 can be configured having hydrodynamic features 41 in the form of ribs or a thread, that act to pump oil back to the oil side O of the seal during rotation of the shaft. Further, the air side end 40 can be provided with a dust exclusion lip 39 that facilitates prevention of contamination ingress from the air-side A to the oil-side O of the seal assembly 10, and further, facilitates maintaining the lubricant on the oil-side O of the assembly 10. The seal lip 24 is formed having a predetermined thickness t1 (shown only in FIG. 1 to avoid cluttering the Figures, as with other dimensional features discussed hereafter) to facilitate maintaining the low-torque seal against the shaft 12, as is discussed in more detail below.

An annular bridge 42 operably connects the seal lip 24 to the seal body 22. The annular bridge 42 is connected to the oil side end 38 of the seal lip 24 by a first hinge 44 and to the central portion 23 of the mounting portion 18 by a second hinge 46. The bridge 42 extends over a length L1 along an imaginary line 45 that extends between and through the hinges 44, 46 at an angle to the horizontal central axis 33, such as between about 20-40 degrees, though the angle can range from 1-89 degrees from horizontal. The second hinge 46 transitions to an orientation that is about parallel with the radial leg 28 of the mounting portion 18 and about perpendicular to a horizontal axis H of the seal 10. The bridge 42 extends from the first hinge 44 to the second hinge 46 in radially overlying relation to the seal lip 24, and thus, provides an annular pocket 48 facing the air-side A of the seal assembly 10. The bridge 42 is constructed having a thickness t2, while the first and second hinges 44, 46 are constructed having respective thickness t3, t4. The relative thicknesses are preferably such that t1>t3; t2>t3, and t2>t4, and more preferably, t1>t3; t2>t3, and t2>t4. In addition, while in the free state, the first hinge 44 has a first diameter H1D and the second hinge 46 has a second diameter H2D, wherein H1D<H2D.

The seal 10 further has a rib, also referred to as projection 50, that extends generally from the first hinge 44 axially away from the seal lip 24 and the bridge 42 toward the oil side O of the seal 10. The projection 50 is configured to aid in the oil-side installation, discussed further below, to prevent the seal lip 24 and bridge 42 from unfolding during installation. Further, the projection 50 is configured to remain out of contact with the shaft running surface 35 upon assembly and during use. In the event the oil side O experiences a pressure change, such as a negative pressure (relative vacuum), the pressure differential across the seal exerts an axially inward force on the seal 10. The projections 50 act at least in part to stiffen the seal lip 24, and thus, acts to prevent the seal lip 24 from lifting out of sealing contact from the shaft running surface 35. The projection 50 has a thickness extending between an inner surface 52 and outer surface 54 that is sufficient to substantially retain its shape and geometry during installation without allowing the projection 50 to roll back or under itself. To facilitate smooth installation, the inner surface 52 is shown to gradually taper, and is further shown as having a convex contour, by way of example and without limitation, toward a free end 56. The inner surface 52 has a minimum diameter PD that is at least slightly greater than the inner diameter of the sealing surface 34 of the seal lip 24, and thus, as mentioned, upon assembly on the shaft 12, the inner surface 52 is spaced radially outwardly out of contact from the running surface 35. The projection 50 has a length L2 that extends generally from the first hinge 44 and/or the oil-side end 38 of the seal lip 24 that is sufficient to counter any forces tending to invert bridge 42, wherein the length L2 is less than the length L1 of the bridge 42. As such, the projection 50 acts primarily during installation as an aid to prevent the seal lip 24 from attaining an other than proper configuration on the shaft 12. As further shown in FIG. 1, the projection 50 is formed substantially above the imaginary line 45, which further enhances the ability of the projection 50 to function as an "anti-inversion" feature for the seal bridge 42. In addition, the projection 50 extends axially inwardly toward the oil-side O from an imaginary line 47 extending perpendicular to the imaginary line 45 through the first hinge 44.

Figure 2:
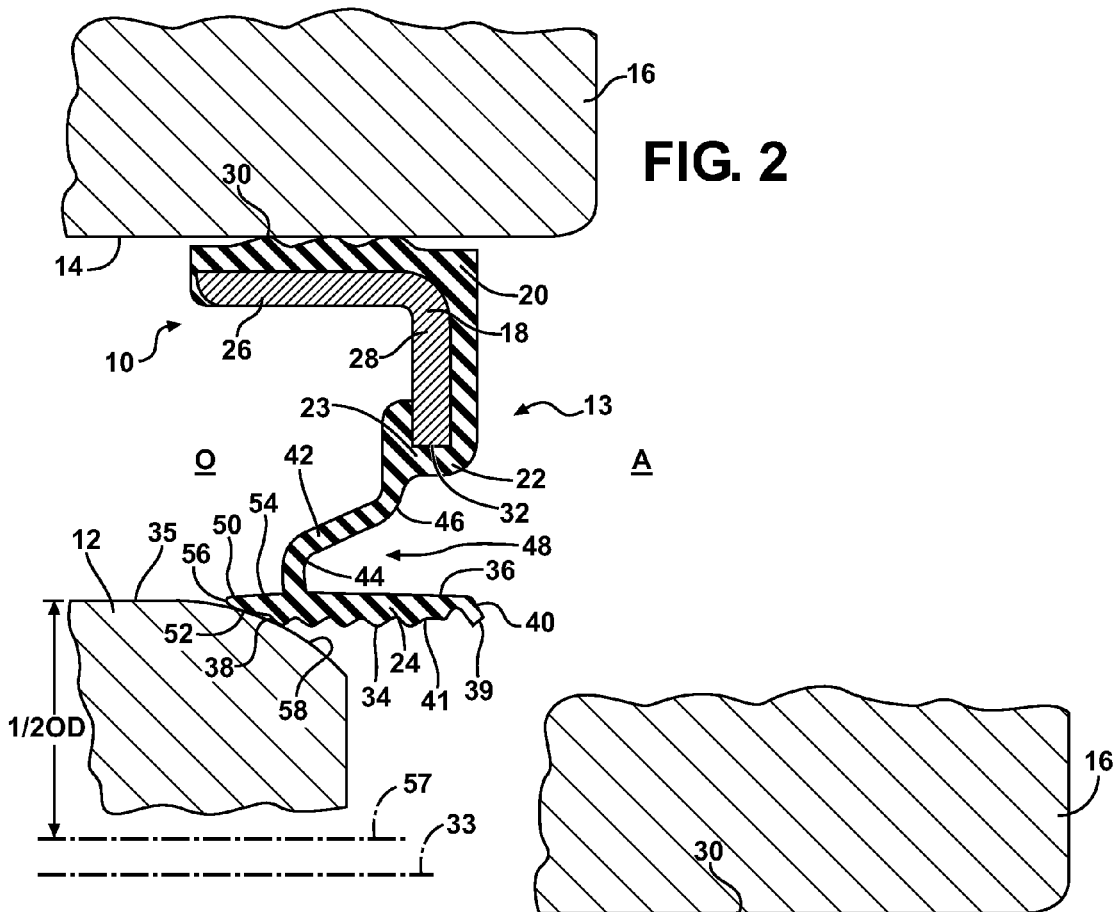
FIG. 2-4 are cross-sectional views of the seal of FIG. 1 shown disposed in a housing with a shaft being installed in progression from an oil-side of the seal.
Figure 3:
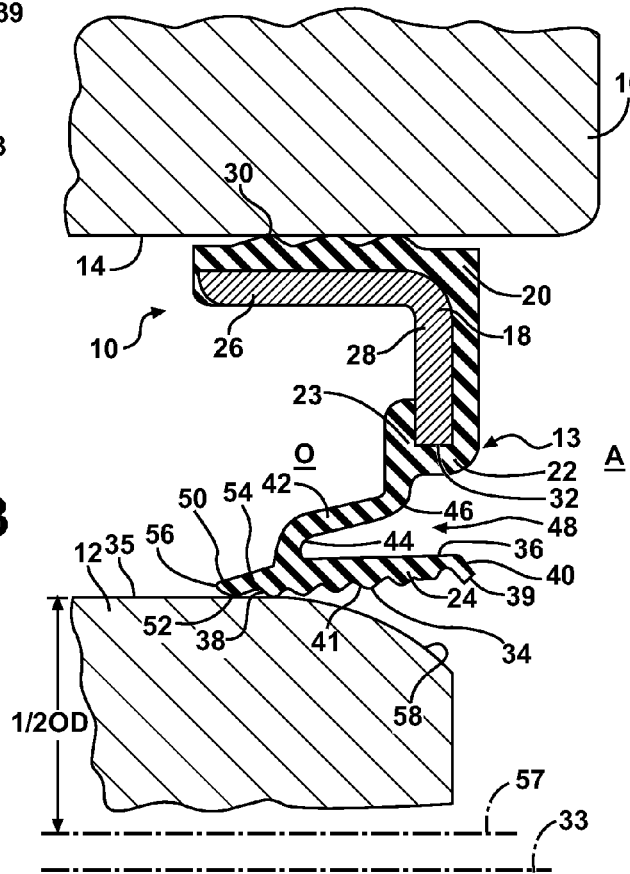
Figure 4:
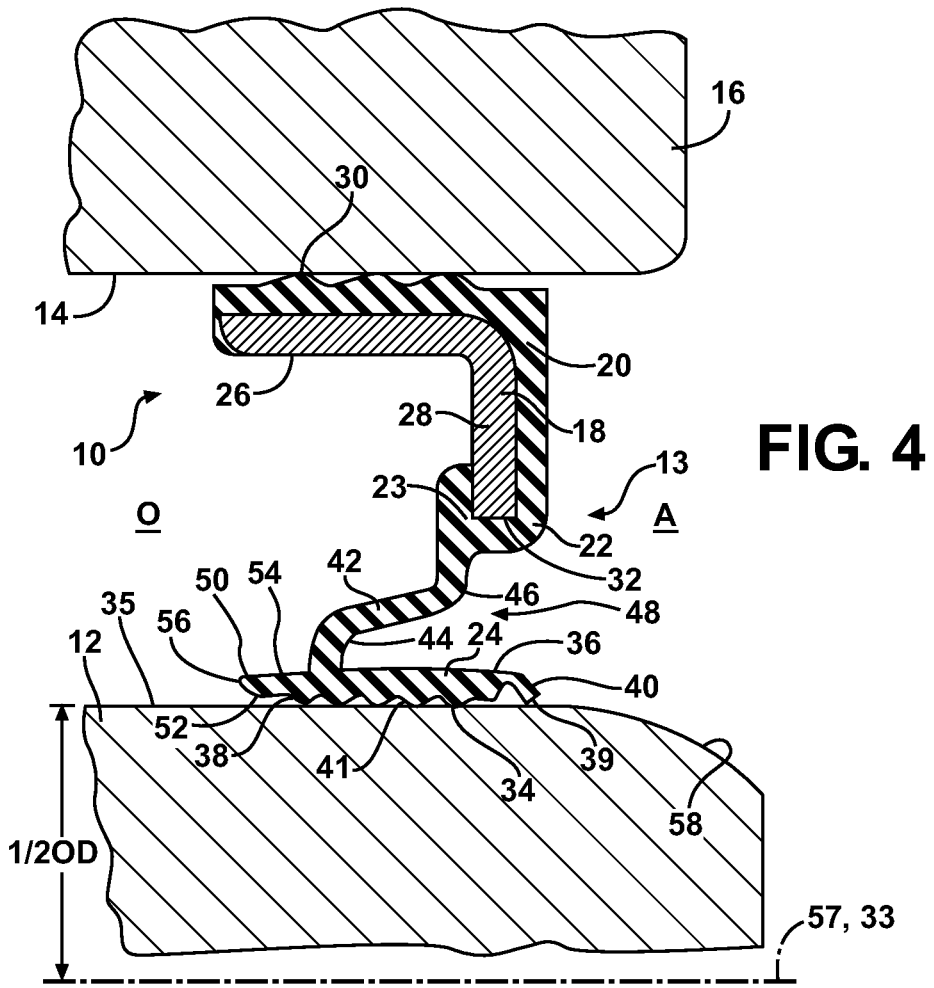

FIGS. 2-4 illustrate an oil-side installation progression of the shaft 12 through the seal 10, wherein a central axis 57 of the shaft 12 is slightly misaligned with the central axis 33 of the seal 10 (FIGS. 2-3) and then coaxially aligned in FIG. 4. In this installation, the seal 10 is already installed into the housing 16, with the shaft 12 thereafter being extended into the bore 14 and through the seal 10. As the shaft 12 is slid axially into the bore 14, an end 58 of the shaft 12 initially engages at least a portion of the projection inner surface 52. To facilitate assembly, the end 58 of the shaft 12 is configured to provide a lead-in tapered surface 60. With the shaft 12 and seal 10 being axially misaligned, it should be recognized that the diametrically opposite sides (not shown) of the seal and shaft are shifted relative to one another accordingly, and thus, a slight gap could result initially between the shaft 12 and projection 50. As shown in FIG. 3, as the shaft 12 progresses axially though the seal 10, a portion of the projection inner surface 52 remains in contact with the shaft 12 as it slides over the shaft tapered lead-in surface 60 onto the running surface 35. As this is occurring, the main seal lip 24 is caused to expand radially outwardly and the air-side end 40 of the seal lip 24 is caused to pitch radially outwardly, such that the pocket 48 is caused to partially collapse, thereby reducing the axial installation force required to install the seal 10 about the shaft 12. As such, the projection 50 acts to bring the seal lip 24 into axial alignment with the shaft 12. In addition, aside from bringing the seal lip 24 into axial alignment with the shaft 12, the projection 50, having its predetermined length L2, acts as a lever arm to counter any torsion forces generated by friction between the seal 10 and the shaft 12 from acting on the bridge 42, thereby preventing the bridge 42 from being rolled and inverted axially outwardly toward the air-side A of the seal 10. Accordingly, as shown in FIG. 4, upon full installation of the shaft 12 through the seal 10, the seal lip 24 attains its proper sealing configuration with the running surface 35 of the shaft 12.

FIG. 5 illustrates a seal 110 constructed in accordance with another aspect of the invention, with FIGS. 6-11 illustrating the seal 110 being installed in an oil-side installation progression on a shaft 112, wherein the same reference numerals as used above, offset by a factor of 100, are used to identify similar features as discussed above. As discussed above, the seal 110 has a mounting portion, shown here, by way of example and without limitation, as having a rectangular metal reinforcing ring structure 118 in cross-section and an elastomeric seal material covering 120, wherein the covering 120 is shown as being molded to encapsulate the ring structure 118. Similarly as discussed above, the material covering 120 is shown having an outer contoured surface with radially outwardly facing ribs for snug and fluid tight installation in a bore 114 of a housing 116.

The elastomeric seal material 120 provides a seal body 122 that extends radially inwardly of the core 118 to a central vertically extending body portion 123. Similarly as in the seal 10 discussed above, the seal 110 has a seal lip 124 and a bridge 142 with a first hinge 144 connecting the seal lip 124 to the bridge 142 and a second hinge 146 connecting the bridge 142 to the central portion 123 of the seal body 122. The relative thicknesses (FIG. 5) of the seal lip t1; bridge t2 and the first and second hinges t3, t4, respectively, are as discussed above. Further, the relative diameters H1D, H2D of the first and second hinges 144, 146 also remain as discussed above. Accordingly, thus far, other than the configuration of the mounting portion 118, the seal 110 is the same as the seal 10.

The notable distinction between the seal 110 and the previously discussed seal 10 can be seen with the location of a projection 150 on the seal 110. With regard to the seal 110, the projection 150 extends from a more radially outward location than the previously discussed projection 50, however, the projections 50, 150 remain similarly shaped. Thus, the projection 150 extends generally from the first hinge 144 axially away from the seal lip 124 and the bridge 142 toward the oil side O of the seal 110, however, in slight contrast to the previous embodiment, it extends from a radially outward location relative to the first hinge 144. As with the previously discussed projection 50, the projection 150 has a thickness extending between an inner surface 152 and outer surface 154 that is sufficient to substantially retain its shape and geometry during installation without allowing the projection 150 to roll under or back on itself. To facilitate smooth installation, the inner surface 152 is gradually tapered to diverge radially outwardly, and is further shown as having a convex contour extending radially outwardly toward a free end 156. The inner surface 152 has a minimum diameter PD that is at least slightly greater than the inner diameter of a sealing surface 134 of the seal lip 124, and thus, as discussed above with regard to the projection 50, upon assembly on the shaft 112, the inner surface 152 is spaced radially outwardly out of contact from the shaft running surface 135. The projection upper or outer surface 154 extends in a smooth transition from the bridge 142 a sufficient length L2 to counter any forces tending to invert bridge 142, wherein the length L2 is less than the length L1 of the bridge 142. As such, as with the projection 50 discussed above, the projection 150 acts primarily during installation to prevent the seal lip 124 from attaining an other than proper configuration on the shaft 112. Further, even more so than the projection 50, the projection 150 is formed entirely above an imaginary line 145 extending between the first and second hinges 144, 146, which further enhances the ability of the projection 150 to function as an "anti-inversion" lever arm feature for the seal bridge 142. In addition, the projection 150 extends axially inwardly toward the oil-side O from an imaginary line 147 extending perpendicular to the imaginary line 145 through the first hinge 144.

As discussed above, the dimensional aspects of the projection 150, including its inside diameter, thickness and length provide its ability to prevent the bridge 142 from becoming inverted during assembly.

Figure 5A:
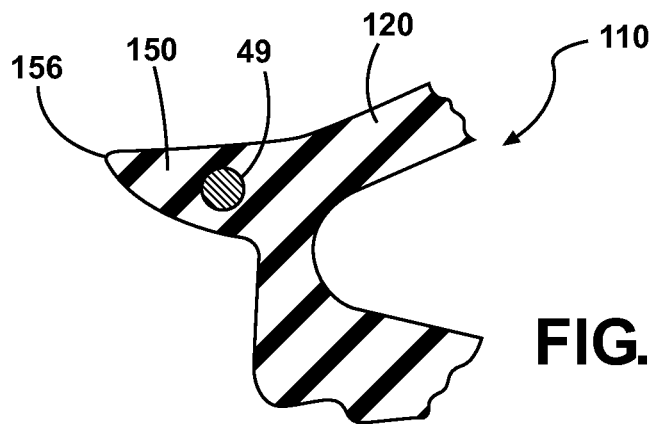
FIG. 5A is a partial cross-sectional view taken generally from the encircled area 5A of FIG. 5 showing a radial shaft seal construction in accordance with another aspect of the invention.
Figure 6:
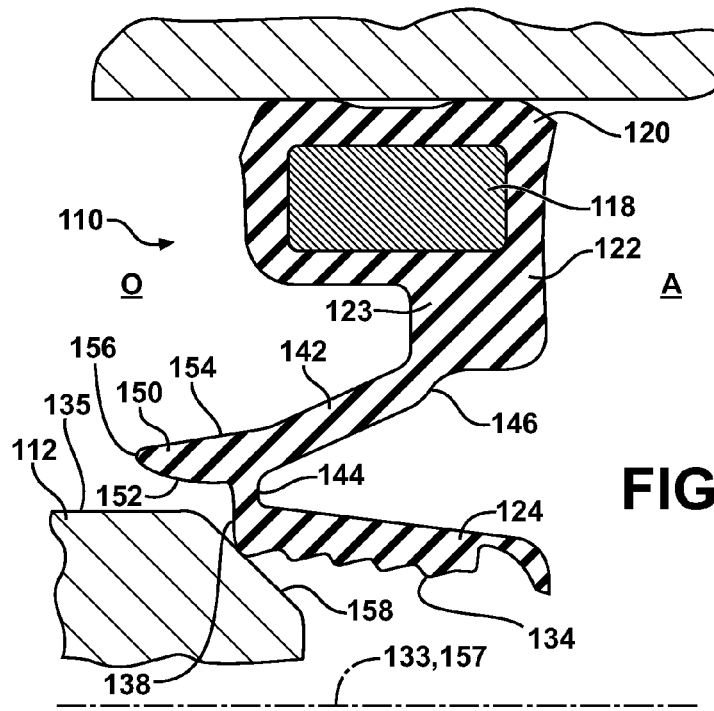
FIGS. 6-11 illustrate cross-sectional views of the seal of FIG. 5 shown disposed in a housing with a shaft being installed in progression from an oil-side of the seal in co-axially aligned relation with the seal.
Figure 7:
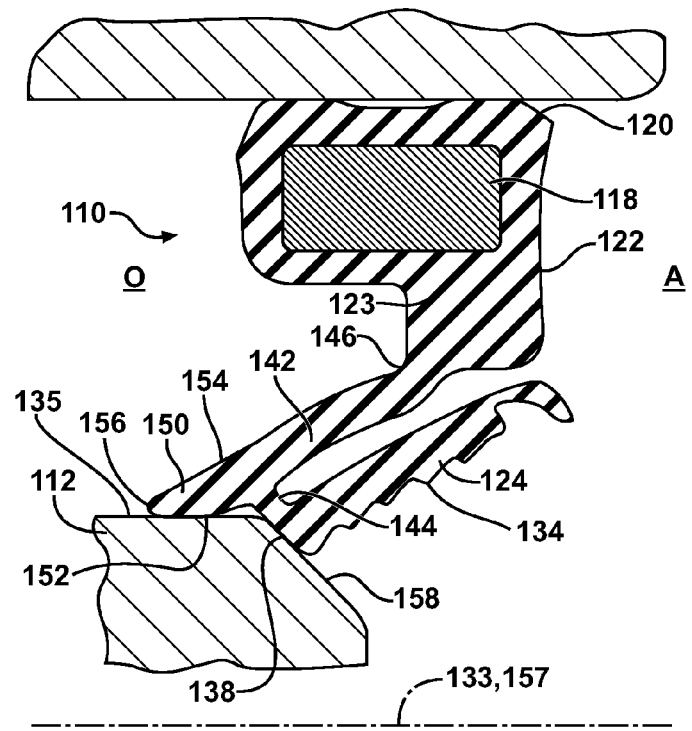
Figure 8:
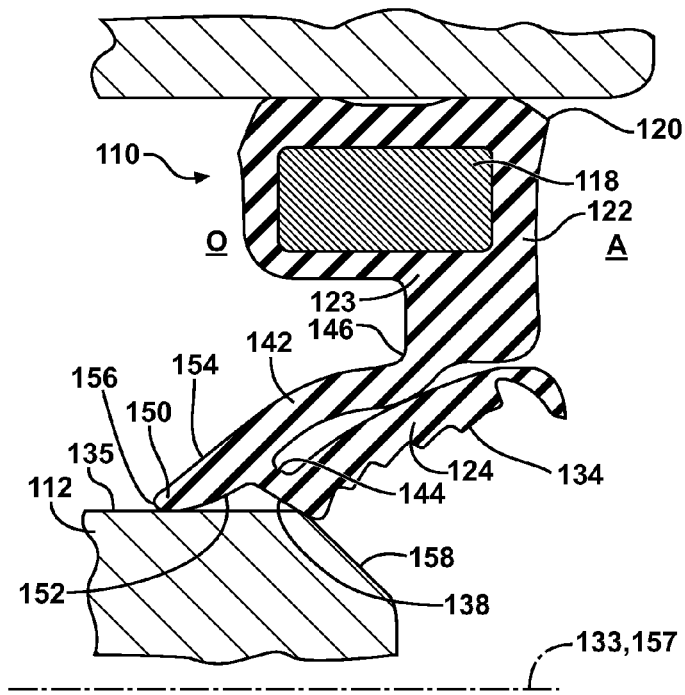
Figure 9:
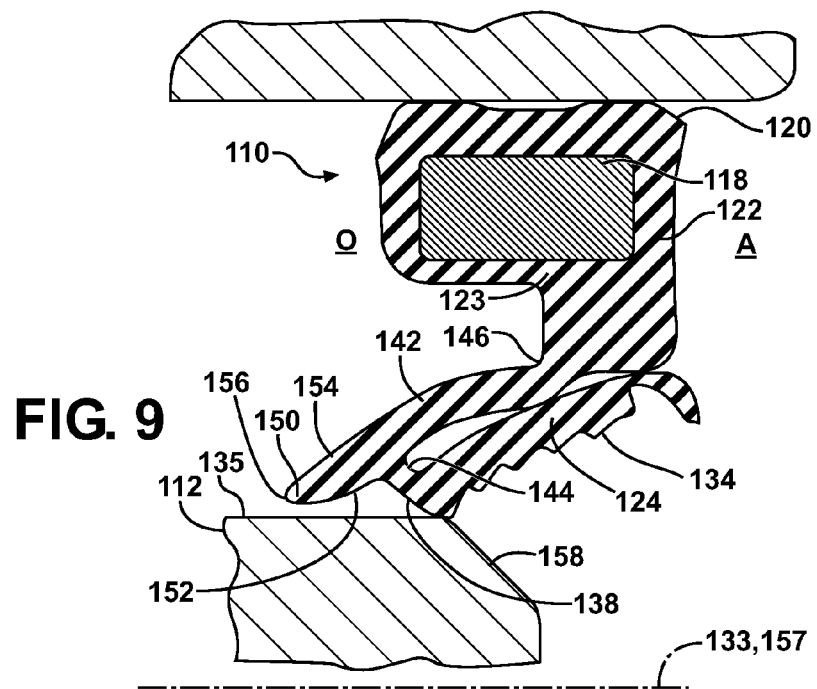
Figure 10:
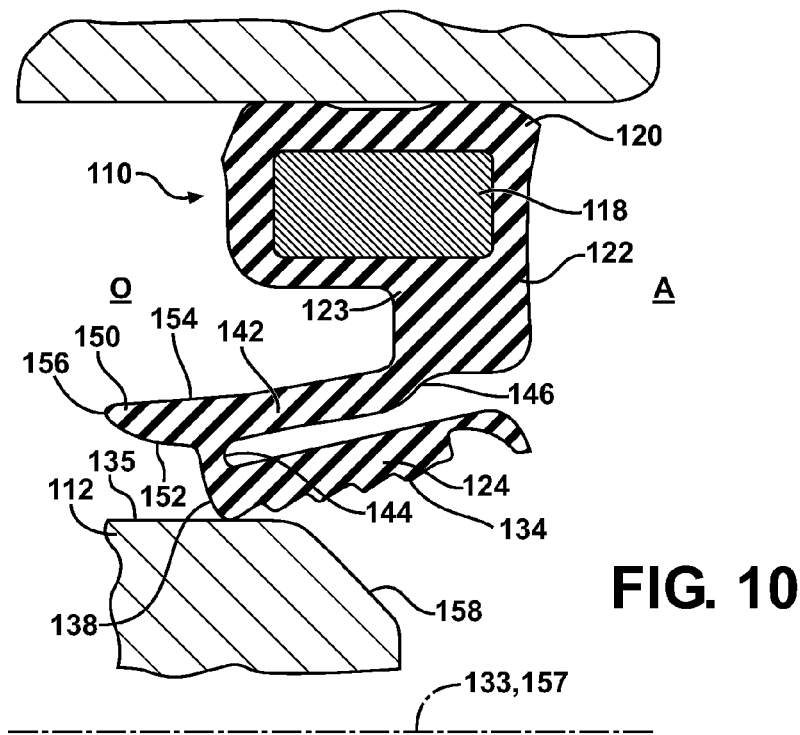
Figure 11:
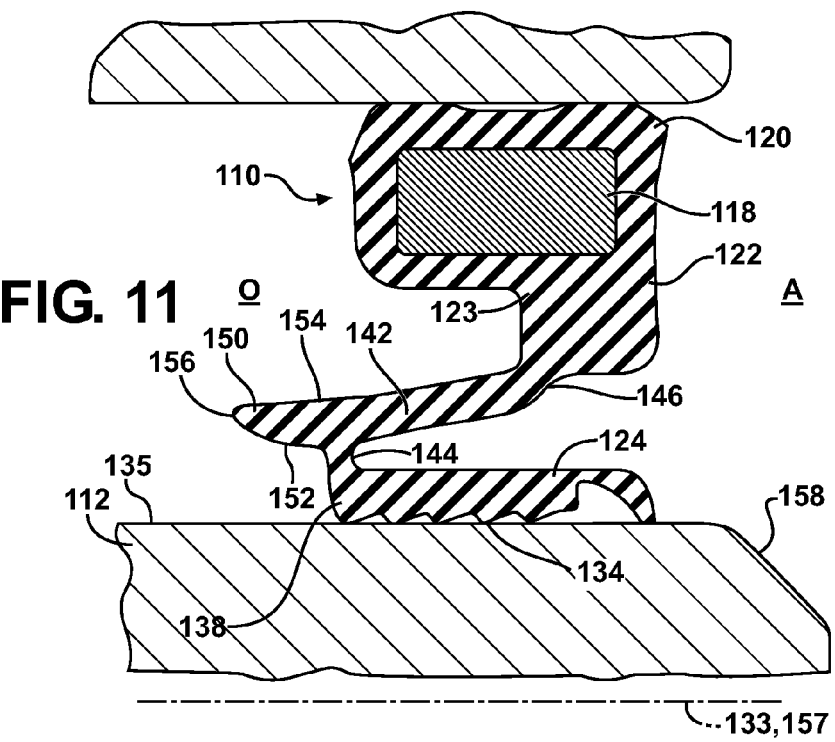
Figure 12:
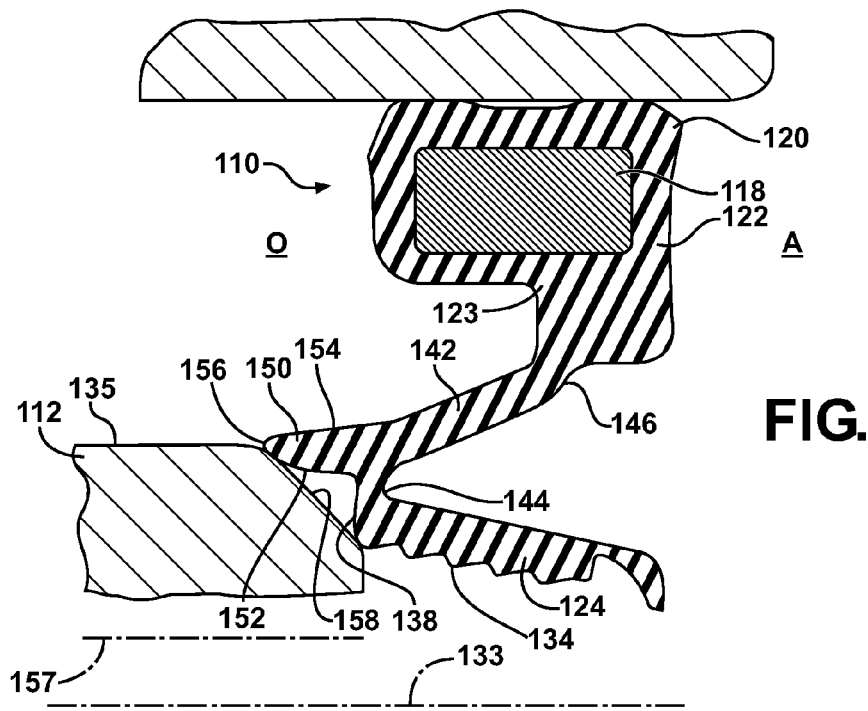
FIGS. 12-18 illustrate cross-sectional views of the seal of FIG. 5 shown disposed in a housing with a shaft being installed in progression from an oil-side of the seal in axially misaligned relation with the seal.
Figure 13:
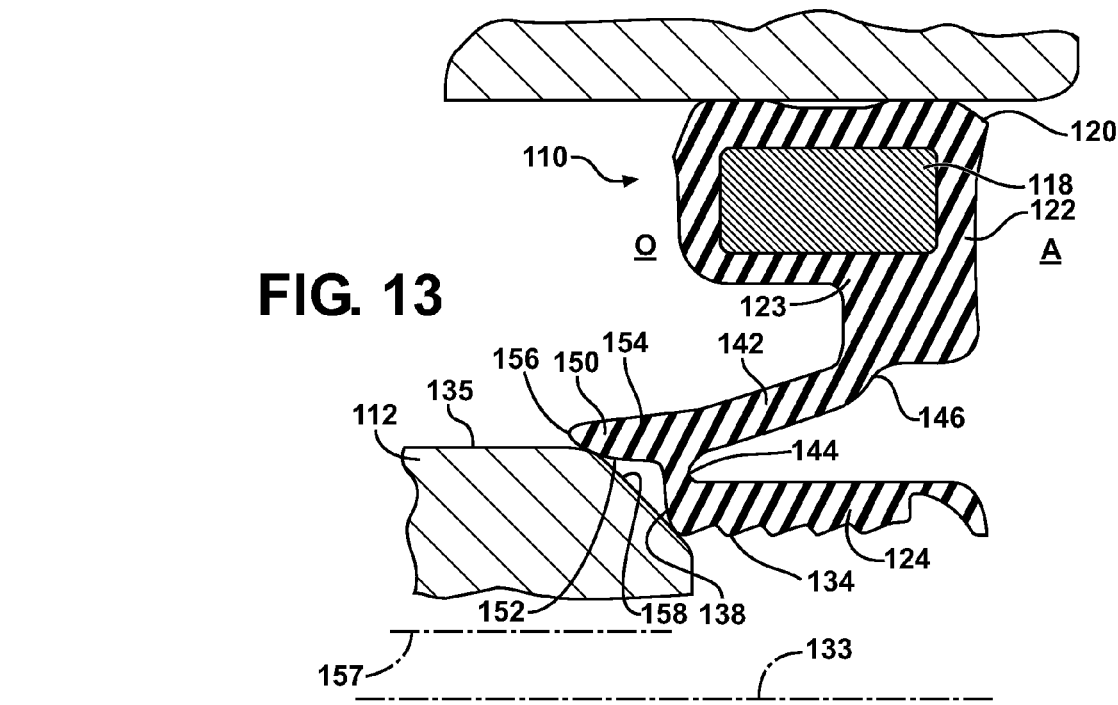
Figure 14:
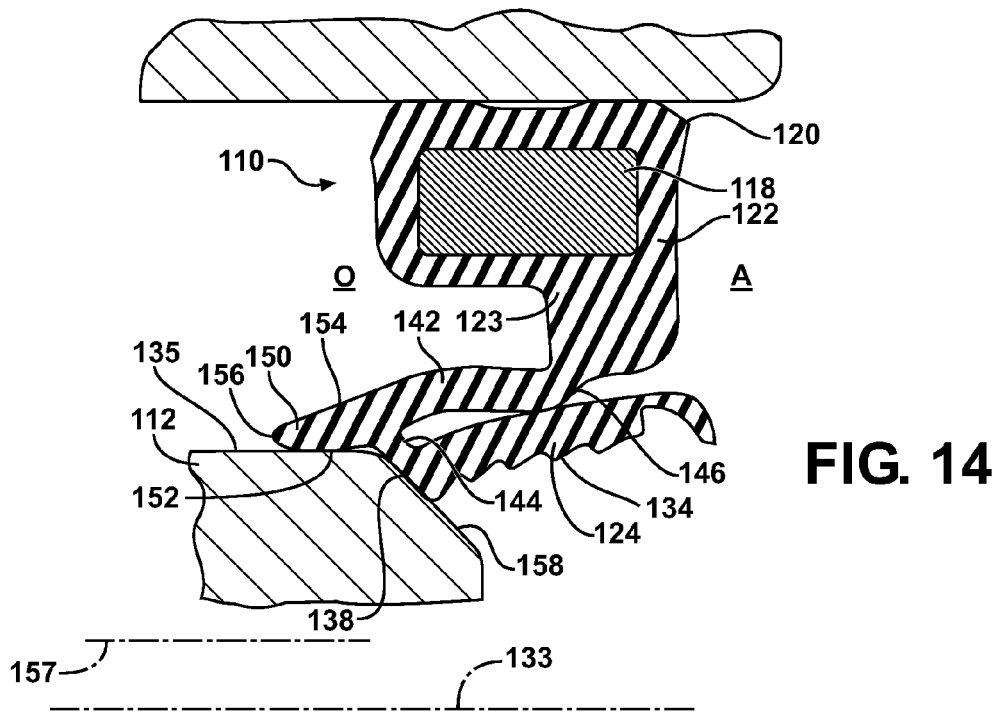
Figure 15:
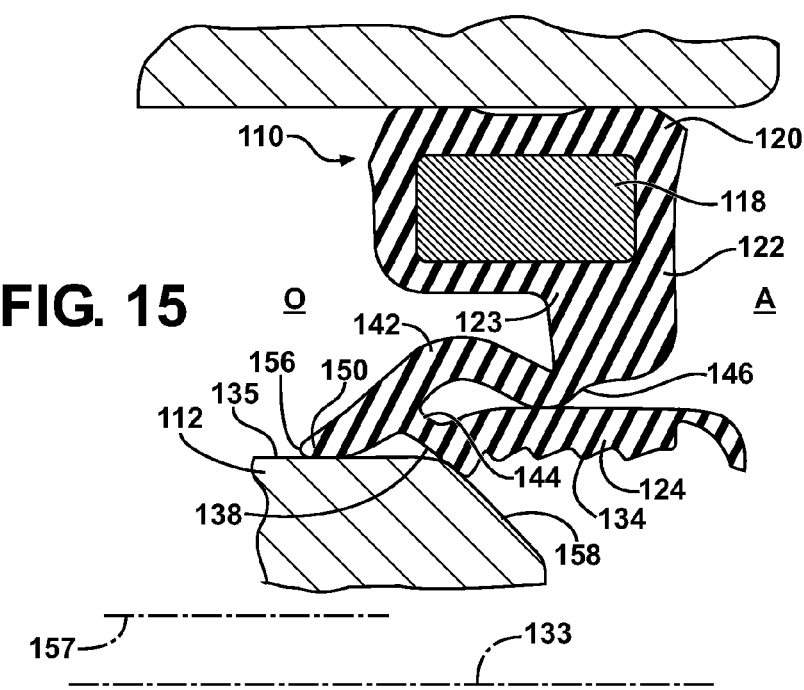
Figure 16:
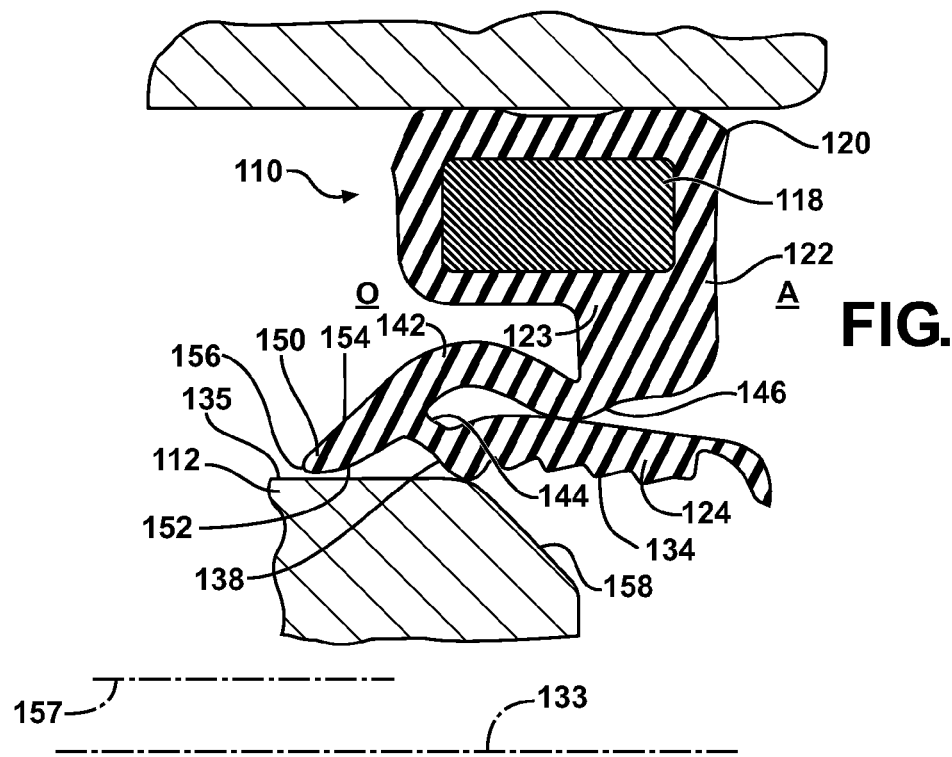
Figure 17:
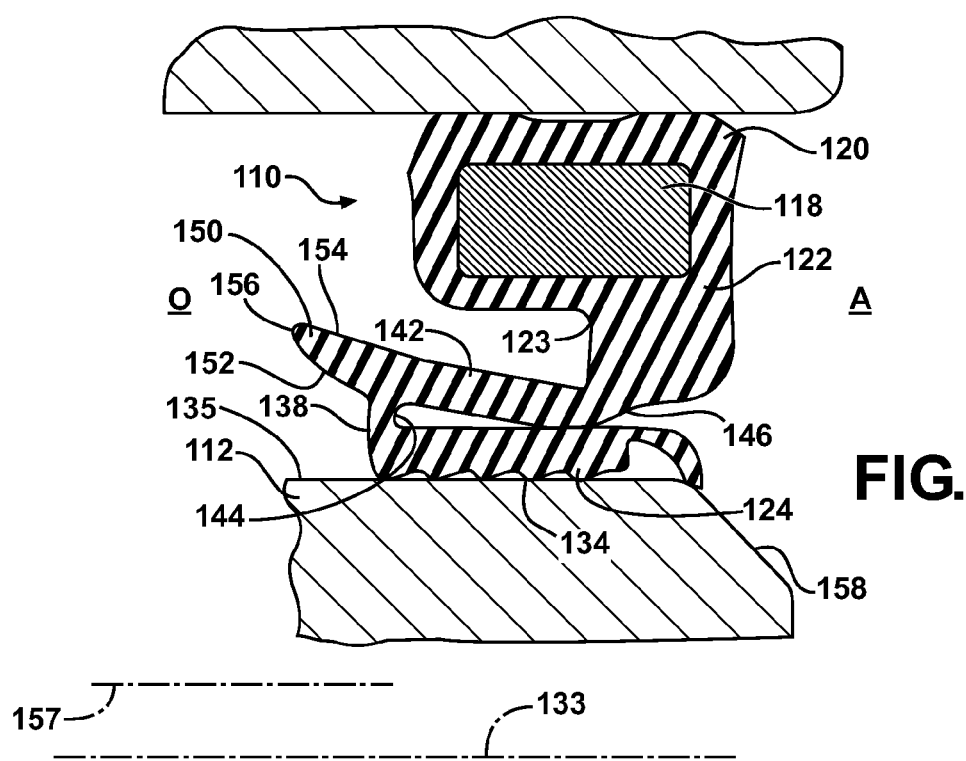
Figure 18:
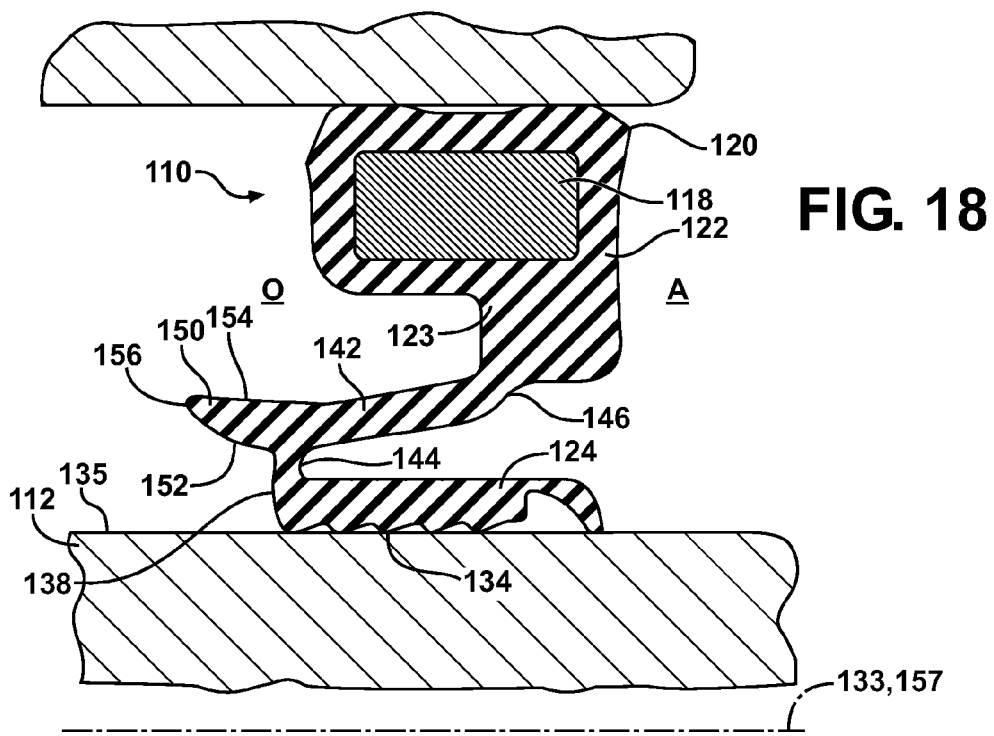

FIG. 5A illustrates the seal 110 having a stiffening member 49 extending circumferentially through the projection 150, wherein the stiffening member 49 is formed of a relatively stiffer material from the seal material 120. The stiffening member 49, by way of example and without limitation, can be formed of metal, e.g. wire, plastic, or a different, stiffer rubber material from the seal material. Accordingly, the stiffening member adds radial stiffness to the projection 150.

FIGS. 6-11 illustrate an oil-side installation progression of the shaft 112 through the seal 110, wherein a central axis 157 of the shaft 112 is coaxially aligned with the central axis 133 of the seal 110. In this installation, the seal 110 is already installed into the housing 116, with the shaft 112 thereafter being extended into the bore 114 and through the seal 110. As the shaft 112 is slid axially into the bore 114, a tapered end 158 of the shaft 112 initially engages the oil-side end 138 of the seal lip 124. This occurs because the inner surface 152 of the projection 150, having a larger diameter than the shaft 112, is radially outward from the shaft 112, and thus, does not make initial contact with the shaft 112. The engagement of the end 138 of the seal lip 124 with the end 158 of the shaft 112 causes the seal lip 124 to pitch radially outwardly, such that the pocket 148 is caused to partially collapse, while simultaneously causing the projection to pitch radially inwardly. This pitching motions are free to continue until the inner surface 152 of the projection 150 engages the outer surface of the shaft 112, whereupon the stiffness of the projection 150 substantially prevents any further pitching. As such, the inner surface 152 is caused to slide along the shaft 112, as shown in the series of progression views, until the sealing surface 134 is fully received on the shaft 112, at which time, the inner surface 152 of the projection moves out of circumferential contact from the shaft 112.

FIGS. 12-18 illustrate an oil-side installation progression of the shaft 112 through the seal 110 that follows the same progression as described for FIGS. 6-11, however, the central axis 157 of the shaft 112 is axially misaligned with the central axis 133 of the seal 110. As the shaft 112 is slid axially into the bore 114, a tapered end 158 of the shaft 112 initially engages the inner surface 152 projection 150, which slides along the tapered end 158 until it contacts the running surface 135 and the end 138 of the seal lip 124 engages the end 158 of the shaft 112. The engagement of the end 138 of the seal lip 124 with the end 158 of the shaft 112 causes the seal lip 124 to pitch radially outwardly, such that the pocket 148 is caused to partially collapse, while simultaneously causing the projection to pitch radially inwardly and maintain contact with the running surface 135. When the inner surface 152 is caused to slide along the shaft 112, as shown in the series of progression views, and fully received on the shaft 112, the inner surface 152 of the projection moves out of circumferential contact from the shaft 112.

Figure 19:
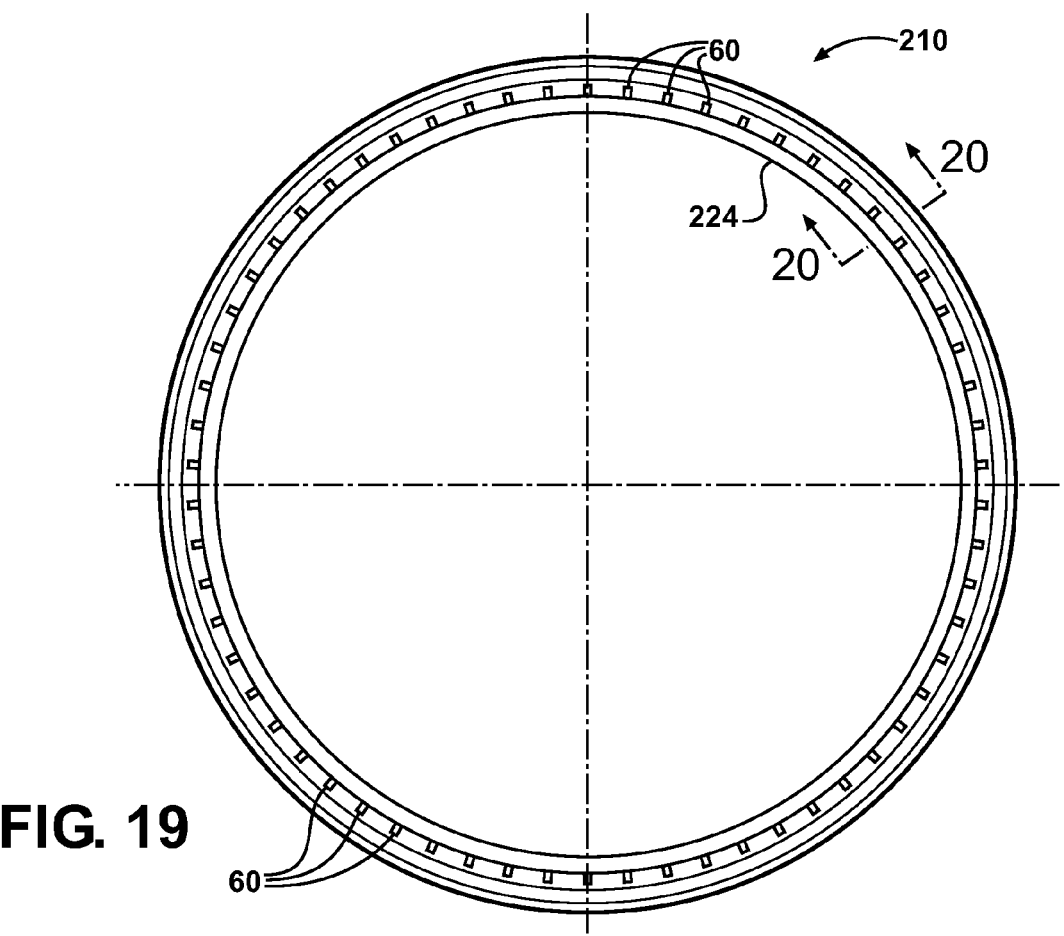
FIG. 19 is a plan view of a radial shaft seal constructed according to another aspect of the invention.
Figure 20:
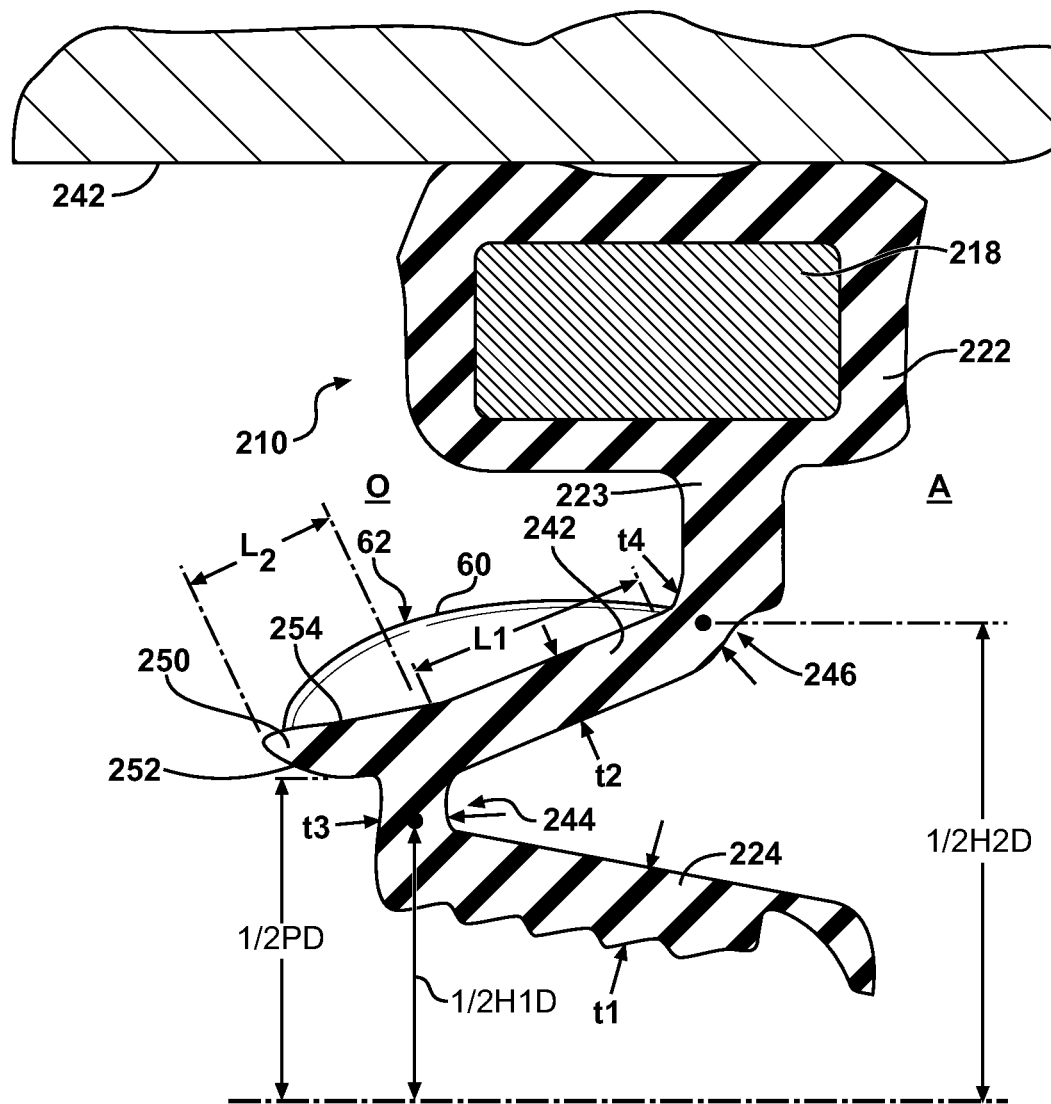
FIG. 20 is a cross-sectional view taken generally along the line 20-20 of FIG. 19.
Figures 21, 22, 23:
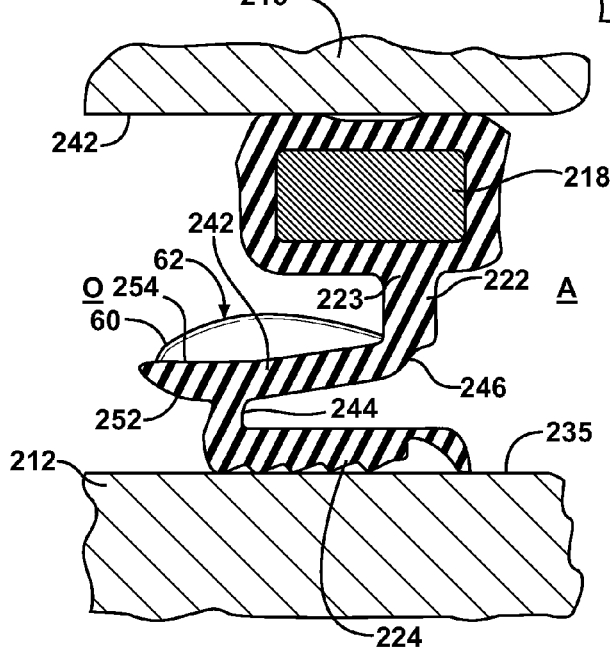
FIGS. 21-23 are cross-sectional views of the seal of FIG. 20 shown disposed in a housing with a shaft being installed in progression from an oil-side of the seal.

FIGS. 19 and 20 illustrate a seal 210 constructed in accordance with another aspect of the invention, with FIGS. 21-23 illustrating the seal 210 being installed in an oil-side installation progression on a shaft 212, wherein the same reference numerals as used above, offset by a factor of 200, are used to identify similar features as discussed above. The seal 210 is constructed generally the same as discussed above with regard to FIG. 5, including a mounting collar 218 contoured with radially outwardly facing ribs for snug and fluid tight installation in a bore 242 of the crankcase housing 216. Further, a seal body 222 extends radially inwardly from the core 218 to a central vertically extending body portion 223. The seal 210 has a seal lip 224 and a bridge 242 with a first hinge 244 connecting the seal lip 224 to the bridge 242 and a second hinge 246 connecting the bridge 242 to the central portion 223 of the seal body 222. The relative thicknesses of the seal lip t1; bridge t2 and the first and second hinges t3, t4 are as discussed above. Further, the relative diameters H1D, H2D of the first and second hinges 244, 246 also remain as discussed above. Accordingly, thus far, other than the configuration of the mounting portion 218 and the seal 210 is the same as the seal 110. In addition, a projection 250 extends generally from the first hinge 244 and the bridge 242 toward the oil side O. The projection 250 has a thickness extending between an inner surface 252 and outer surface 254, and is shaped generally the same as that discussed with regard to the previously discussed projections 50, 150. The inner surface 252 has a minimum diameter PD that is greater than the maximum inner diameter of a sealing surface 234 of the seal lip 224, and thus, as discussed above with regard to the projection 50, upon assembly on the shaft 212, the inner surface 252 is spaced radially outwardly out of contact from the shaft running surface 235. The projection outer surface 254 extends in a smooth transition from the bridge 242 a sufficient length L2 to counter any forces tending to invert bridge 242, wherein the length L2 is less than the length L1 of the bridge 242, as discussed with regard to seal 110.

The notable distinction between the seal 210 and the previously discussed seal 110 can be seen with the addition of a pluralist of stiffening ribs 60 molded as one piece of material with the seal body 222. The ribs 60 facilitate assembly and to maintain a sealing surface 234 of the seal lip 224 in proper sealing relation with the running surface 235 of the shaft 212 during and upon assembly. The ribs 60 extend axially along the bridge 242, and are shown here as extending along the upper or outer surface 254 of the projection 250 and along the full length of the bridge 242 and terminating at the central body portion 223 of the seal body 222. The ribs 60 can be provided in any suitable number sufficient to prevent reverse folding of the bridge 242 and the main seal lip 224 during assembly, and is shown in FIG. 19, by way of example and without limitation, as being about 60 ribs. Each rib 60 is spaced radially from an adjacent rib 60, with the ribs 60 being spaced equidistant from one another about the circumference of the seal body 222. The height of the ribs 60 is such that an uppermost surface 62 of the ribs 60 remain spaced from the seal body 222 upon being assembled. As such, the ribs 60 do not interfere with the ability of the second hinge 246 to flex in use.

An oil side installation progression of the shaft 212 through the seal 210 is generally the same as discussed with regard to FIGS. 6-11 for a co-axially aligned installation, and the same as discussed with regard to FIGS. 12-18 for an axially misaligned installation. However, as the seal assembly 110 is moved axially onto to the shaft 212, and when the inner surface 252 of the projections 250 engage the shaft 212, the ribs 60 are placed under slight tension and act to prevent the seal lip 224 and bridge 242 from inverting and unfolding. Further, the ribs 60 add rigidity to the projection 250, which further enhances the ability of the seal lip 224 to be maintained in sealing engagement with the shaft 212, such as when a vacuum is established on the oil-side O of the seal 210. As such, the seal lip 224 is assured of being maintained in a proper sealing orientation on the shaft 212 during and upon completion of the assembly process.

Figure 24:
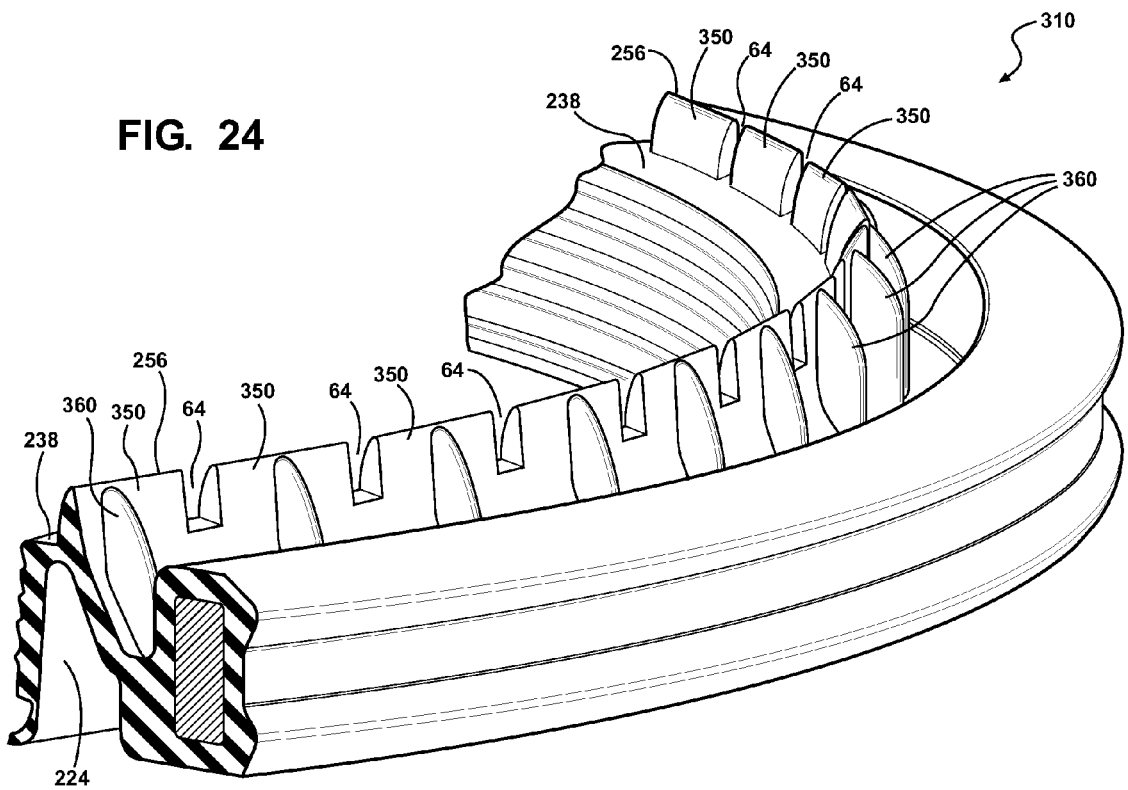
FIG. 24 is a partial perspective view of a radial shaft seal constructed according to another aspect of the invention.

FIG. 24 illustrate a portion of a seal 310 constructed in accordance with another aspect of the invention, wherein the same reference numerals as used above, offset by a factor of 300, are used to identify similar features as discussed above.

The seal 310 is similar to the seal 210, wherein all the features are the same with the exception that a plurality of gaps 64 extend axially into a projection 350, thereby providing a plurality of radially spaced projections 350 spaced radially from one another by the gaps 64. The gaps 64 and projections 350 are provided in uniformly spaced relation and size, thereby providing the seal 350 having a circumferentially symmetric appearance. The gaps 64 extend axially from an oil-side end 238 of the seal lip 224 through to free ends 256 of adjacent projections 350. In the embodiment shown in FIG. 24, the gaps 64 occupy about 20 percent of the total circumference (gaps 64+projections 350) of the seal body 322. The gaps 64 provide enhance radial flexibility to the individually spaced projections 350 during assembly by allowing the projections 350 to flex individually relative to one another, while the projections 350 maintain their ability to prevent inversion of the bridge 342 and unfolding of the seal lip 324. In the embodiment shown, by way of example, each of the projections 350 have one of the ribs 360 extending centrally thereon to enhance their axial stiffness, though it should be recognized that few ribs could be used, depending on the application, thereby leaving at least some of the projections 350 without ribs.

Figure 25:
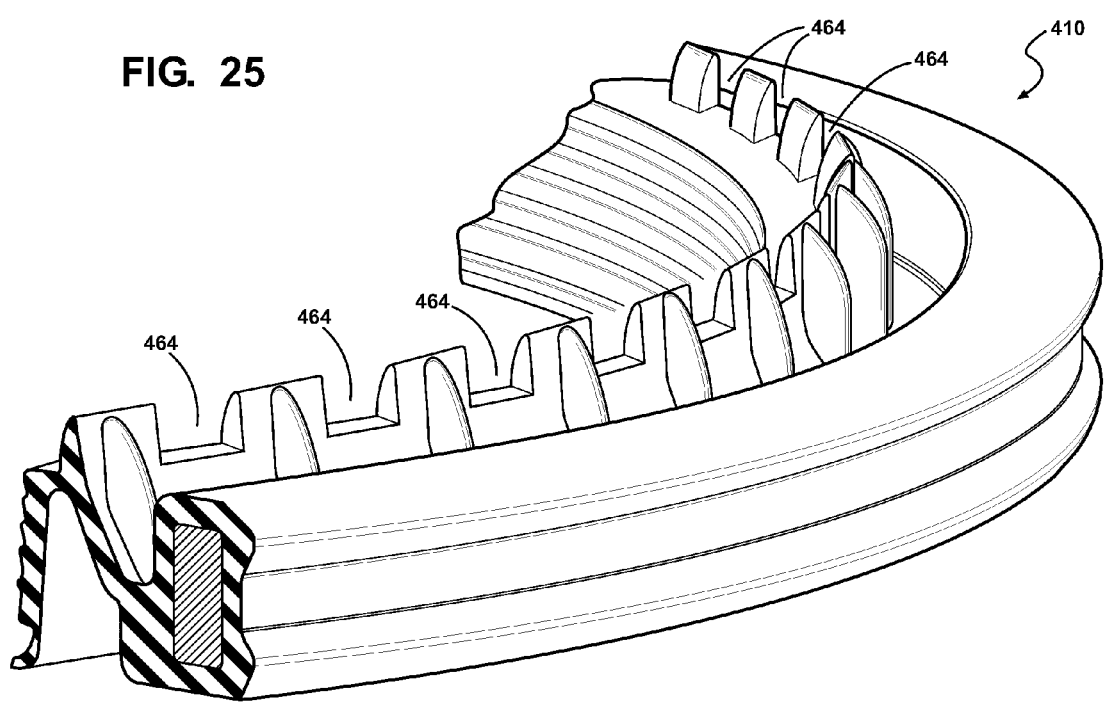
FIG. 25 is a partial perspective view of a radial shaft seal constructed according to another aspect of the invention.

FIG. 25 illustrates a portion of a seal 410 constructed in accordance with another aspect of the invention, wherein the same reference numerals as used above, offset by a factor of 400, are used to identify similar features as discussed above. The seal 410 is similar to the seal 310, however, a plurality of gaps 464 occupy about 50 percent of the total circumference (gaps 464+projections 450) of the seal body 422. Otherwise, the construction is the same.

Figure 26:
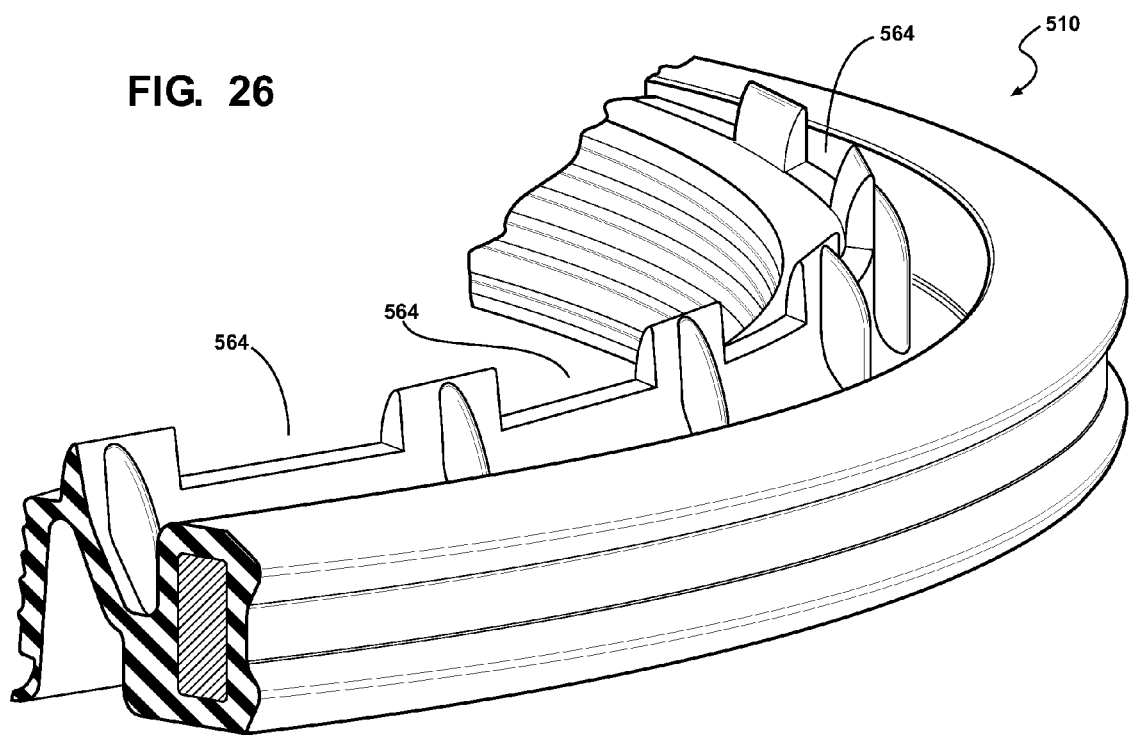
FIG. 26 is a partial perspective view of a radial shaft seal constructed according to another aspect of the invention.

FIG. 26 illustrates a portion of a seal 510 constructed in accordance with another aspect of the invention, wherein the same reference numerals as used above, offset by a factor of 500, are used to identify similar features as discussed above. The seal 510 is similar to the seal 410, however, a plurality of gaps 564 occupy about 66 percent of the total circumference (gaps 564+projections 550) of the seal body 522. Otherwise, the construction is the same.

Figure 27:
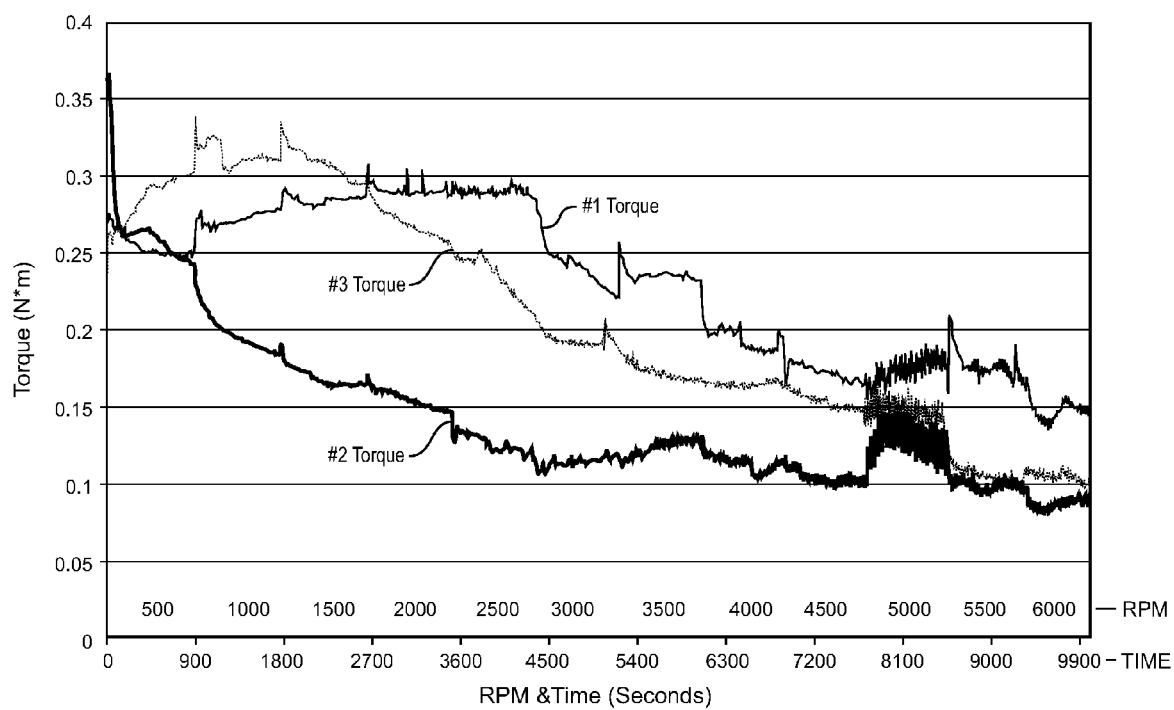
FIG. 27 is a plot of running torque versus rpm for predetermined periods of time of three seals constructed in accordance with the invention.

FIG. 27 is a plot of three different seals constructed in accordance with FIG. 5 assembled on a shaft and tested over a range of rpm's for a specified period of time. The torque was measured and recorded as indicated by the vertical axis, while the rpm and time duration thereof is indicated along the horizontal axis. As can be seen, the initial torque of the new seals started out at about 0.27 N*m, with one being initially higher at about 0.37 N*m, with the torque then becoming reduced as the time and rpm increased, lowering to between about 0.07 to 0.15 N*m. Accordingly, the seals demonstrated a low initial torque "as new", while providing an even lower torque upon run-in. The seals were provided having a nominal running surface diameter at the oil-side end of 96.72 mm (+/−0.38 mm) and a nominal running surface diameter at the air-side end of 96.01 mm (+/−0.38 mm). The shaft was provided having a nominal running surface diameter of 98.00 mm (+/−0.05 mm). As such, the maximum interference between the shaft and the seal lip is about 2.42 mm at the diameter at the air-side end of the seal lip and about 1.71 mm on the diameter at the oil-side end of the seal lip. Meanwhile, the minimum interference between the shaft and the seal lip is about 1.56 mm on the diameter at the air-side end of the seal lip and about 0.85 mm on the diameter at the oil-side end of the seal lip.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A radial shaft seal configured for receipt in a housing and about a shaft to sealingly isolate an air side of the shaft seal from an oil side of the shaft seal, comprising:
   an annular mounting portion;
   a seal lip having an annular sealing surface extending between an oil side end and a free air side end, said sealing surface being configured to extend axially relative to the shaft;
   an annular bridge connected to said oil side end of said seal lip by a first hinge and to said mounting portion by a second hinge, said bridge extending from said first hinge to said second hinge in radially overlying relation to said seal lip; and
   at least one projection extending from said first hinge away from said bridge toward said oil side of said seal, wherein said at least one projection has a radially inwardly facing inner surface with a minimum diameter that is greater than said diameter of said sealing surface and wherein said radially inwardly facing inner surface of said at least one projection diverges radially outwardly from said first hinge away from said sealing surface.

2. The radial shaft seal of claim 1 wherein said projection has an inner minimum diameter and said sealing surface has an inner maximum diameter, said minimum diameter being greater than said maximum diameter.

3. The radial shaft seal of claim 2 wherein said seal lip has a radially outwardly facing surface with a maximum diameter and said minimum diameter of said projection is greater than said outwardly facing maximum diameter of said seal lip.

4. The radial shaft seal of claim 1 wherein said projection has a length extending from said first hinge and said bridge has a length that is greater than said length of said projection.

5. The radial shaft seal of claim 1 wherein said first hinge has a thickness and said seal lip has a thickness that is greater than said thickness of said first hinge.

6. The radial shaft seal of claim 5 wherein said bridge has a thickness that is greater than said thickness of said first hinge.

7. The radial shaft seal of claim 6 wherein said thickness of said seal lip is greater than said thickness of said bridge.

8. The radial shaft seal of claim 6 wherein said thickness of said bridge is greater than said thickness of said second hinge.

9. The radial shaft seal of claim 1 wherein said bridge has a thickness that is greater than said thickness of said second hinge.

10. The radial shaft seal of claim 9 wherein said bridge has a thickness that is greater than said thickness of said first hinge.

11. The radial shaft seal of claim 9 wherein said seal lip has a thickness that is greater than said thickness of said second hinge.

12. The radial shaft seal of claim 9 wherein said seal lip has a thickness that is greater than said thickness of said bridge.

13. The radial shaft seal of claim 1 wherein said first hinge extends between said seal lip and said projection.

14. The radial shaft seal of claim 1 further comprising a plurality of circumferentially spaced ribs extending axially along said projection and said bridge.

15. The radial shaft seal of claim 14 wherein said ribs are spaced radially from said mounting portion.

16. The radial shaft seal of claim 14 wherein said ribs are spaced equidistantly about said seal.

17. The radial shaft seal of claim 14 wherein said projection is circumferentially continuous.

18. The radial shaft seal of claim 1 further comprising a plurality of said projections spaced from one another by gaps.

19. The radial shaft of claim 18 wherein an upstanding rib extends axially along said bridge and along at least some of said projections.

20. The radial shaft seal of claim 19 wherein said ribs extend along each of said projections.

21. The radial shaft seal of claim 18 wherein said gaps occupy at least 20 percent of the total circumference of said projections and said gaps combined.

22. The radial shaft seal of claim 21 wherein said gaps occupy at least 50 percent of the total circumference of said projections and said gaps combined.

23. The radial shaft seal of claim 22 wherein said gaps occupy at least 66 percent of the total circumference of said projections and said gaps combined.

24. The radial shaft seal of claim 1 wherein said first hinge extends has a first diameter and said second hinge has a second diameter that is greater than said first diameter.

25. A radial shaft seal assembly, comprising:
a shaft extending along a central axis and providing a running surface with a predetermined diameter; and
a radial shaft seal configured for receipt in a housing and about said shaft to sealingly isolate an air side of the radial shaft seal from an oil side of the shaft seal, comprising:
an annular mounting portion;
a seal lip having an annular sealing surface and an opposite backing surface extending between an oil side end and a free air side end, said sealing surface being configured to extend axially in dynamic sealing contact with said running surface;
an annular bridge attached to said oil side end of said seal lip by a first hinge and to said mounting portion by a second hinge, said bridge extending from said first hinge to said second hinge in radially overlying relation to said seal lip;
at least one projection extending axially from said first hinge toward said oil side of said seal; and
wherein said projection has a radially inwardly facing inner surface with a minimum diameter that is greater than said diameter of said running surface and wherein said radially inwardly facing inner surface of said projection diverges radially outwardly from said first hinge away from said running surface.

26. The radial shaft seal assembly of claim 25 wherein said backing surface of said seal lip has an outer diameter, said minimum diameter of said projection being greater than said outer diameter.

27. The radial shaft seal assembly of claim 25 wherein said projection has a length extending from said first hinge to a free end and said bridge has a length extending between said first hinge and said second hinge that is greater than said length of said projection.

28. The radial shaft seal assembly of claim 25 wherein said first hinge extends radially between said seat lip and said projection.

29. The radial shaft seal assembly of claim 25 wherein said first hinge has a thickness, said seal lip has a thickness, and said bridge has a thickness, said thicknesses of said bridge and said seal lip being greater than said thickness of said first hinge.

30. The radial shaft seal assembly of claim 25 wherein said first hinge has a first diameter and said second hinge has a second diameter that is greater than said first diameter.

31. The radial shaft seal assembly of claim 25 wherein said seal lip maintains a torque between about 0.07 to 0.37 N*m in use.

32. The radial shaft seal assembly of claim 31 wherein said torque is attained with an interference between the shaft and the seal lip of about 0.85 mm on the diameter.

33. A radial shaft seal assembly comprising:
a shaft extending along a central axis and providing a running surface with it predetermined diameter; and
a radial shaft seal configured for receipt in a housing and about said shaft to sealingly isolate an air side of the radial shaft seal from an oil side of the radial shaft seal, comprising:
an annular mounting portion;
a seat lip basing an annular sealing surface and an opposite backing surface extending between an oil side end and a free air side end, said sealing surface being configured to extend axially dynamic sealing contact with said running surface;
an annular bridge attached to said oil side end of said seal lip by a first hinge and to said mounting portion by a second hinge, said bridge extending from said first hinge to said second hinge in radially overlying relation to said seal lip;
at least one projection extending axially from said first hinge toward said oil side of said seal; and
further comprising a plurality of ribs extending axially along said projection and said bridge.

34. The radial shaft seat assembly of claim 33 wherein said ribs are circumferentially spaced equidistantly about said bridge.

35. The radial shaft seal assembly of claim 34 wherein said at least one projection includes a plurality of said projections spaced from one another by gaps.

36. The radial shaft seal assembly of claim 34 wherein said gaps extend from said first hinge axially away from said bridge.

37. The radial shaft assembly of claim 35 wherein at least one of said ribs extends axially along each of said projections.

38. The radial shaft seal assembly of claim 35 wherein said gaps occupy at least 20 percept of the total circumference of said projections and said gaps combined.

39. The radial shaft seal assembly of claim 38 wherein said gaps occupy at least 50 percent of the total circumference of said projections and said gaps combined.

40. The radial shaft seal assembly of claim 39 wherein said gaps occupy at least 66 percent of the total circumference of said projections and said gaps combined.

41. A method of installing a radial shaft seal onto a shaft, comprising:
providing a shaft haying a running surface;
providing the radial shaft seal with a seal lip having an annular sealing surface converging from an oil side end to a free air side end while in a free state with an annular bridge attached to the oil side end by a first hinge and diverging to a second hinge while in the free state, the second hinge being attached to an outer mounting portion such that the bridge extends in radially overlaying relation with the seal lip, the seal further including at least one projection extending axially from the first hinge toward an oil side of the seal, wherein the projection has a radially inwardly facing inner surface with a minimum diameter that is greater than a diameter of the running surface;

moving the shaft and the radial shaft seal axially toward one another;

bringing the oil side end of the seal lip into abutment with an end of the shaft;

bringing the projection into abutment with running surface of the shaft; and bringing the sealing surface into sealing engagement with the running surface and simultaneously moving the projection out of abutment with the running surface wherein the radially inwardly facing inner surface of the projection diverges radially outwardly from the first hinge away from the running surface.

42. The method of claim 41 further including providing the shaft with a tapered end and bringing the projection into abutment with the tapered end.

43. The method of claim 42 further including causing the projection to slide over the tapered end into abutment with the running surface.

44. The method of claim 41 further including providing the projection with a predetermined length and thickness to maintain the projection facing the oil side of the radial shaft seal throughout installation.

45. The method of claim 41 further including causing the sealing, surface to pivot at least in part via the first hinge from the converging configuration to a diverging configuration while abutting the end of the shaft.

46. The method of claim 41 further including providing the radial shaft seal with a plurality of ribs extending axially along the bridge and placing at least some of the ribs in tension during installation.

47. The method of claim 46 further including providing the radial shaft seal with a plurality of the circumferentially spaced projections.

48. The method of claim 47 further including extending at least one of the ribs axially along each of the projections.

49. The method of claim 41 further including causing at least a portion of the bridge to bow radially outwardly and pivot about the second hinge.

* * * * *

UNITED STATES PATENT AND TRADEMARK OFFICE
CERTIFICATE OF CORRECTION

PATENT NO. : 8,500,130 B2  
APPLICATION NO. : 12/695404  
DATED : August 6, 2013  
INVENTOR(S) : Sedlar et al.

Page 1 of 1

It is certified that error appears in the above-identified patent and that said Letters Patent is hereby corrected as shown below:

In the Claims

| Column: | Line: | |
|---|---|---|
| 11 | 30 | "of the shaft seal" should read "of the radial shaft seal" |
| 11 | 61 | "said seat lip" should read "said seal lip" |
| 12 | 12 | "it" should read "a" |
| 12 | 18 | "a seat lip" should read "a seal lip" |
| 12 | 18 | "basing" should read "having" |
| 12 | 21 | "axially dynamic" should read "axially in dynamic" |
| 12 | 32 | "seat" should read "seal" |
| 12 | 44 | "percept" should read "percent" |
| 12 | 54 | "haying" should read "having" |
| 12 | 61 | "overlaying" should read "overlying" |

Signed and Sealed this  
Twenty-fourth Day of December, 2013

Margaret A. Focarino  
*Commissioner for Patents of the United States Patent and Trademark Office*